Sept. 20, 1971      G. H. BJORK      3,605,404
POLLUTION AND NOISE REDUCING MUFFLER
Filed Sept. 29, 1969
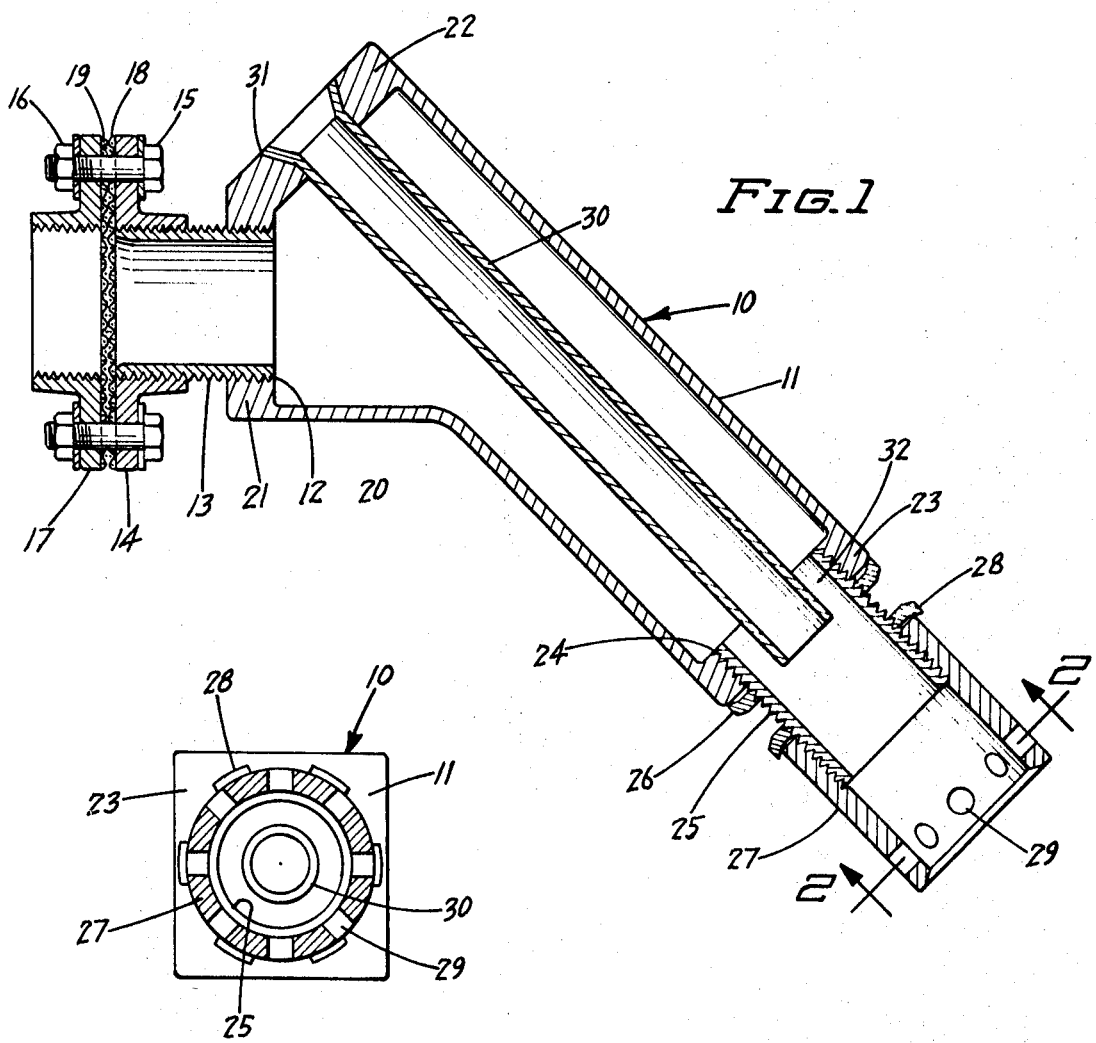
INVENTOR.
GUST H. BJORK
BY
Burd, Braddock & Bartz
ATTORNEYS United States Patent Office 3,605,404
Patented Sept. 20, 1971

3,605,404
POLLUTION AND NOISE REDUCING MUFFLER
Gust H. Bjork, 2601 Parkview Blvd.,
Robbinsdale, Minn. 55422
Filed Sept. 29, 1969, Ser. No. 861,677
Int. Cl. F01n 3/10
U.S. Cl. 60—30    3 Claims

ABSTRACT OF THE DISCLOSURE

A pollution and noise reducing muffler for internal combustion engines having a hollow tubular body having an exhaust gas inlet into one end and discharge from the other. The inlet end of the tubular body is preferably disposed with its axis at an obtuse angle relative to the longitudinal axis of the muffler and is desirably spanned with foraminous material, such as metal screening. The downstream end of the muffler body functions as an aspirator to draw air through the body to preheat the air before admixture with the exhaust fumes adjacent the discharge end of the muffler. The muffler reduces pollution by promoting further combustion of combustible constituents of the exhaust gases. For maximum noise reduction the muffler body is of rectangular cross-section.

---

This invention relates to a system for the reduction of objectionable constituents in exhaust gases, and of the noise attendant upon their emission, from internal combustion engines, such as automobile engines, bus engines, snowmobile engines, engines for lift trucks and loaders, engines for plaster pumps, and the like. More particularly the invention relates to a muffler device for attachment to the exhaust manifold of an internal combustion engine for the reduction of the quantities of unburned hydrocarbons and carbon monoxide emitted from the exhaust system of the engine.

The exhaust gases from the average automobile and similar internal combustion engines contain a mixture of carbon monoxide, carbon dioxide, unburned or partially burned hydrocarbons, nitrogen, some of the nitrogen oxides, and, under certain conditions, portions of unconsumed air. It is reasonably well established that these automobile exhaust gases and similar exhaust gases from other internal combusiton engines contribute to the production of smog and other forms of air pollution. In certain urban areas air pollution exists to such an extent as to be considered objectionable and potentially harmful. As a result states have begun to legislate against the introduction into the atmosphere of gases which contribute to pollution of the atmosphere. Exemplary of this is legislation enacted in California which establishes for 1970 model cars a maximum permissible content of hydrocarbon in escaping automobile exhaust of 2.2 grams per mile and maximum carbon monoxide content of 23 grams per mile. For stringent requirements have been approved for 1972 models by which maximum permissible hydrocarbon would be reduced to 1.5 grams per mile. The pollution problem is especially acute and potentially dangerous where an internal combustion engine is operated indoors, as on a fork lift truck in a warehouse.

Prior attempts to reduce the unburned hydrocarbon and carbon monoxide content in engine exhaust have principally been in the form of so-called "after burners" for direct oxidation of the undesired materials with excess air at high temperatures above about 2000° F. and catalytic converters for catalytically oxidizing the unwanted materials with excess air at lower temperatures of the order of 500° F. However, neither of these systems has proved completely satisfactory under the wide variety of operating conditions which must be met in the course of operation of an automobile or similar engine in normal use.

The principal object of this invention is to provide a simple muffler system for exhaust gases from internal combustion engines to effectively reduce the content of objectionable gaseous constituents while also functioning to suppress noise.

The invention is illustrated by the accompanying drawings in which the same numerals refer to corresponding parts and in which:

FIG. 1 is an elevation, in section, of the muffler device according to the present invention; and FIG. 2 is a transverse section on the line 2—2 of FIG. 1 and in the direction of the arrows.

Referring now to the drawings, the exhaust pollution and noise reducing muffler according to the present invention shown there, indicated generally at 10, includes a tubular body 11 which is preferably of generally rectangular cross-section. The body 11 is internally threaded at 12 so as to be adapted to be connected to the exhaust manifold of an internal combustion engine or otherwise connected to receive engine exhaust.

One end of a nipple 13 engages the internal threads 12 of the body 11. The other end of nipple 13 engages a flanged fitting 14 connected by means of a plurality of bolts 15 and nuts 16 to a similar flanged fitting 17 adapted to be connected directly to the exhaust manifold of most engines. A pair of fine mesh stainless steel screens 18 and 19 are gripped between the opposing flanges of fittings 14 and 17 and securely held extending transversely and spanning the opening through the flanged fittings and nipple 13.

The screen is desirably of relatively fine mesh with about 15 to 30 openings per linear inch in both directions formed from about 0.075 to 0.12 inch wire. Because two screens are preferably superimposed, the effective cross-sectional opening of the superimposed screens will in most cases be less than that of either screen standing alone. It is preferred, however, to use somewhat coarser screen than a finer screen having the same cross-sectional opening since the coarser screen has a somewhat longer effective life.

Depending upon the structure of the particular engine with which the muffler is used, flanged fitting 14 may be secured directly to the engine. In this instance, screens 18 and 19 are then secured between the engine and flanged fitting 14.

Tubular housing 11 is provided with an upstream angular extension 20. The upstream wall 21 of this extension through which the threaded opening 12 extends forms an oblique angle of about 135 degrees with the upstream wall 22 of tubular body 11. This means that the longitudinal axis of the sub-assembly comprising nipple 13 and fittings 14 and 17 intersects the longitudinal axis of tubular body 11 at an angle of about 135 degrees in the downstream direction.

The downstream end wall 23 of housing 11 is provided with a slightly constricted internally threaded port 24 into which is threaded one end of a nipple 25 secured by a lock nut 26. A discharge tube 27 is internally threaded at one end and secured to the opposite end of nipple 25, held by lock nut 28. A plurality of radial ports 29 extend through the wall of discharge tube 27 adjacent its downstream end.

An elongated air inlet and preheating tube 30 extends through the upstream wall 22 of housing 11 and the entire length of the housing body through threaded port 24 and into nipple 25. The upstream end of tube 30 is desirably flared outwardly and is swaged or otherwise secured in an opening 31 in the end wall 22 so as to lie generally along the longitudinal axis of the body 11. A constricted annular opening 32 is formed between the outer wall of tube 30 and the inner wall of nipple 25.

All of the functional components of the muffler device, with the exception of nipple 13 and screens 18 and 19, are desirably formed from aluminum or aluminum alloys which are lightweight, heat conductive and capable of long life under high temperature conditions. Nipple 13 is desirably formed from steel. Screens 18 and 19 are formed from stainless steel.

The hot exhaust gases emitted from the engine pass through screens 19 and 18 and nipple 13 into the tubular body 11 entering at an oblique angle of about 135 degrees relative to the longitudinal axis of the body 11 in the downstream direction. The exhaust gases pass through the constricted annular throat 32 surrounding the downstream end of the air inlet tube 30 creating a venturi effect. The resulting zone of reduced pressure within nipple 25 induces flow of air in abundant quantity through tube 30, the air is heated by conduction from the hot exhaust gases. This heated air meets and mixes with the exhaust gases in the zone within nipple 25 and discharge tube 27 where substantially complete combustion takes place prior to emission of the gases into the atmosphere.

The muffler is especially adapted for use on snowmobiles which are powered primarily by two cycle engines, and to a lesser extent by four cycle engines, whose emissions have a high unconsumed oil content. Although not desiring to be bound by any particular theory, it is believed that combustion of the oil emitted from two cycle engines such as used on snowmobiles along with the exhaust gases is catalyzed by the steel screening and steel nipple 13. It is believed that complete combustion of the exhaust gases takes place as a result of the intimate admixture of the gases with preheated hot air present in great abundance.

Both the rectangular cross-section of tubular body 10 and radially disposed holes 29 contribute to sound suppression. The invention is not limited to any particular cross-section but the square cross-section is preferred.

Although size is not a critical limitation of the muffler for purposes of illustration, in a muffler intended for use on motors up to about 50 horsepower in size, housing 11 is about 7½ inches in overall length, and about 2¼ inches square. End walls 21-23 are desirably about ½ inch thick for strength whereas the other walls are about ⅛ inch. Nipples 13 and 25 are about 1¾ inches long and about 1¼ inches inside diameter. Discharge tube 27 is about 2 inches long and 1½ inch inside diameter. Air tube 30 is about ⅛ inch longer than housing 11 and about 9/16 inch inside diameter. Other dimension are proportional. Holes 29 are ¼ inch in diameter centered ⅜ inch in from the end of tube 27. For a larger engine up to about 300 horsepower, the housing is about 2 inches longer and about 4 inches square, with other dimensions proportional.

It is apparent that many modifications and variations of this invention as hereinbefore set forth may be made without departing from the spirit and scope thereof.

The embodiments of the invention in which an exclusive property or privilege is claimed are defined as follows:

1. A pollution and noise reducing muffler for an internal combustion engine comprising:
 (A) a hollow tubular body of generally rectangular cross section having an exhaust gas inlet adjacent one end and a gas discharge at the other end;
 (B) means at said inlet end for connecting to an internal combustion engine, said means comprising:
  (1) a tubular steel fitting, one end of said fitting extending through the body wall and the other end of said fitting being provided with means for securing the fitting to the engine,
  (2) fine mesh stainless steel screening extending transversely across the opening within said tubular fitting, and
  (3) the longitudinal axis of said tubular fitting generally intersecting the longitudinal axis of said tubular body at an obtuse angle in the downstream direction;
 (C) a constricted passage at said discharge end;
 (D) a hollow air inlet tube extending from the upstream end of said body to said constricted passage,
  (1) said air inlet tube lying generally along the longitudinal axis of said tubular body, substantially concentric with said constricted passage,
  (2) the upstream end of said tube extending through the body and being in communication with the atmosphere.
  (3) the downstream end of said tube being concentric with and defining the inside of an annular passage within said constricted passage; and
 (E) a tubular discharge extending from the discharge end of said body.

2. A muffler according to claim 1 further characterized in that said tubular body, air inlet tube and tubular discharge are composed predominantly of aluminum.

3. A muffler according to claim 1 further characterized in that a plurality of radially extending holes are provided in said tubular discharge adjacent the end thereof.

References Cited

UNITED STATES PATENTS

| | | | |
|---|---|---|---|
| 1,382,810 | 6/1921 | Storrie | 181—51 |
| 2,524,588 | 10/1950 | Bechtel | 60—29 |
| 2,832,430 | 4/1958 | Coombs | 181—43 |
| 2,986,000 | 5/1961 | Gerlach | 60—30 |
| 3,032,967 | 5/1962 | Dosie | 60—30 |
| 3,285,709 | 11/1966 | Eannarino | 60—30 |

FOREIGN PATENTS

| | | | |
|---|---|---|---|
| 1,131,802 | 10/1956 | France | 60—30 |

DOUGLAS HART, Primary Examiner

U.S. Cl. X.R.

23—277C; 181—51, 60

PO-1050
(5/69)

UNITED STATES PATENT OFFICE
CERTIFICATE OF CORRECTION

Patent No. 3,605,404        Dated September 20, 1971

Inventor(s) Gust H. Bjork

It is certified that error appears in the above-identified patent and that said Letters Patent are hereby corrected as shown below:

Column 1, line 46, "combusiton" should be --combustion--.

Column 1, line 57, "For" should be --More--.

Column 3, line 19, after "tube 30" --. In its passage through tube 30-- is omitted.

Column 3, line 51, "dimension" should be --dimensions--.

Signed and sealed this 14th day of March 1972.

(SEAL)
Attest:

EDWARD M. FLETCHER, JR.
Attesting Officer

ROBERT GOTTSCHALK
Commissioner of Patents